May 29, 1951  C. G. PULLIN ET AL  2,555,152
AUTOMATIC CLUTCH FOR POWER TRANSMISSION SYSTEMS
Filed May 11, 1948  2 Sheets-Sheet 1

INVENTORS
Cyril George Pullin
BY Kenneth Watson
Sylvester H. Lechner
ATTORNEYS

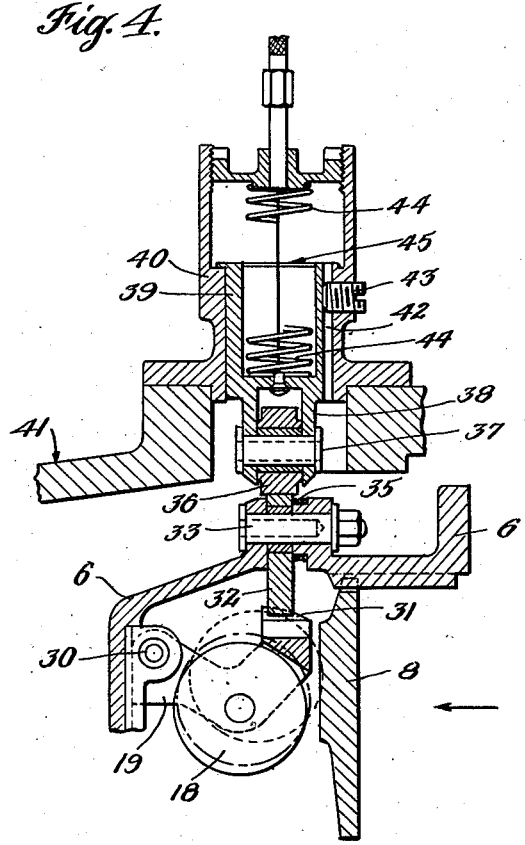
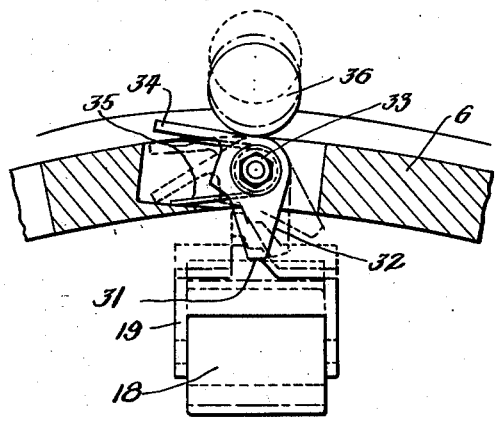

Patented May 29, 1951

2,555,152

UNITED STATES PATENT OFFICE 2,555,152

AUTOMATIC CLUTCH FOR POWER TRANSMISSION SYSTEMS

Cyril George Pullin, Ampfield, and Kenneth Watson, Southampton, England, assignors, by mesne assignments, to Autogiro Company of America, Philadelphia, Pa., a corporation of Delaware Application May 11, 1948, Serial No. 26,458
In Great Britain May 20, 1947

7 Claims. (Cl. 192—48)

This invention relates to automatic clutches for power transmission systems.

The general object of the invention is to provide an automatic compound clutch which will be suitable for connecting a driving motor to a "fan" load, i. e. a load having substantially zero starting torque, and which, (a) Will not engage below a prescribed speed of the driving shaft, (b) Will engage smoothly as the speed of the driver is increased above this prescribed minimum, (c) Will provide a positive drive when the driven shaft approaches its working speed, (d) Can provide for limitation of the torque transmissible at low speeds, and (e) Will allow free overrun of the driven shaft.

A particular object of the invention is to provide a satisfactory automatic clutch for the driving transmission of a helicopter rotor.

According to this invention, a compound clutch comprises in combination a friction clutch and a positive clutch, both serving to connect a driving with a driven member, the positive clutch being of a one-way type and further being automatically engaged by a speed-responsive device, when the driven member exceeds a critical speed, below which the device prevents engagement of the clutch.

In a preferred form of the invention, the friction clutch is automatically controlled by a speed-responsive device which engages it progressively as the speed of the driving member increases above a critical speed, engagement being complete at a speed less than the critical speed which determines the engagement of the positive clutch.

Further, the positive clutch is preferably of the one-way type and an auxiliary positive one-way clutch is arranged in series with the friction clutch, so that the driven member can overrun the driving member freely.

The auxiliary positive one-way clutch preferably connects the driven member of the friction clutch with the driven shaft.

The positive clutches are preferably of the ball- or roller ratchet-type, the speed-responsive device controlling the main positive clutch being constituted by centrifugal elements carried on rockers pivoted on the driven member and operative to urge the ball- or roller-cage in the roller-engaging direction, the cage being spring-loaded in the ball- or roller-disengaging direction. The ball- or roller-cage of the auxiliary clutch may be spring loaded in the ball- or roller-engaging direction.

Speed-responsive control of the friction clutch may be obtained by means of centrifugal elements pivoted on the driving member of the friction clutch and operative on the shifting clutch member to urge it in the engaging direction.

The critical minimum engaging speed of the friction clutch may be provided for by means of a constant spring loading applied either to the centrifugal elements or to the shifting member of the friction clutch in opposition to the centrifugal loading thereof.

Direct control of the friction clutch, and/or of the main positive clutch by centrifugal elements may be replaced by indirect control by a centrifugally governed servo-motor or motors.

Since both the main and auxiliary positive (roller) clutches operate in the same sense, the driven member can overrun freely. On reduction of speed, either by reduction of input power or by braking the driven member, the driving member will overrun when the critical minimum engaging speed of the friction clutch is reached and the driven member falls below this speed, the main positive clutch having automatically disengaged at a higher critical speed, so that risk of stalling of the motor is avoided. On starting up, stalling of the motor is prevented by the inability of the friction clutch to transmit torque until the driving member attains the critical minimum engaging speed; thereafter increase of speed of the driving member, on increasing the power input, is limited by the increase of centrifugal engaging pressure on the friction clutch with speed; and this prevents "running-away" of the motor, should the throttle or equivalent power control be too coarsely operated.

The friction clutch transmits the whole torque until the second critical speed is reached at which the main positive clutch engages, after which any torque in excess of the capacity of the friction clutch to transmit without slipping is taken up by the main positive clutch. This enables the torque-transmitting capacity of the whole clutch assembly at low-speeds to be limited, since below the critical speed at which the main positive clutch engages the torque-transmitting capacity is limited to that of the friction clutch, which can be much less than the maximum torque to be transmitted especially if the torque/speed characteristic of the load is controllably variable, so that the torque to be transmitted can be kept quite low until the positive clutch is engaged, thus making possible considerable saving of weight and size of the friction clutch.

To prevent accidental burning out of the friction clutch by speeding up of the motor when the driven member is braked or otherwise subjected to great resistance, a manually or otherwise separately controlled locking device may be provided which locks the speed responsive control means of the friction clutch in an inoperative condition until released. The control of such a device may be interconnected with a brake acting on the driven member so that the centrifugal control is locked inoperative until the brake is released.

In a preferred form of the locking device, centrifugal clutch engaging elements are locked inoperative by spring-loaded trip levers carried by the driving member and engageable by a displaceable roller mounted in the stationary clutch housing to trip the levers and release the weights.

The nature of the invention will be better understood with the aid of the accompanying drawings showing, by way of example only and in a conventional manner, an embodiment of the improved compound clutch.

In the drawings,

Figure 4 is a detailed view of a modification in axial section;

Figure 5 is a detailed view taken in the direction of the arrow in Figure 4 (with the clutch plate 8 removed).

Figure 1:
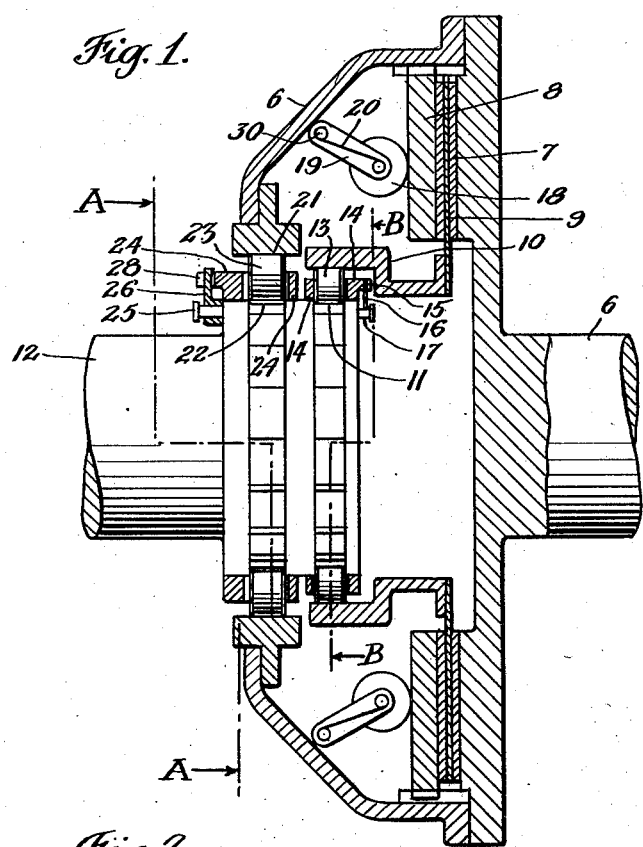
Figure 1 is an axial section of the compound clutch.
Figure 2:
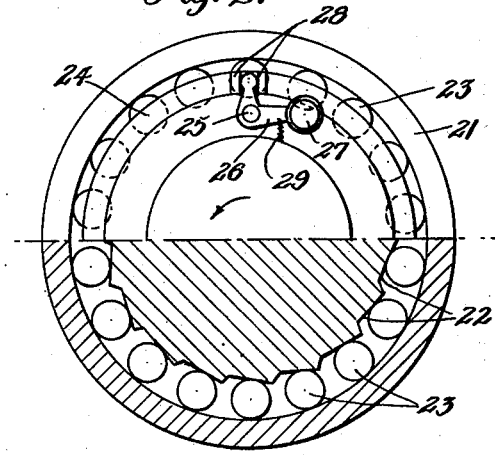
Figures 2 and 3 are radical sections on the line A—A and B—B respectively of Figure 1.
Figure 3:
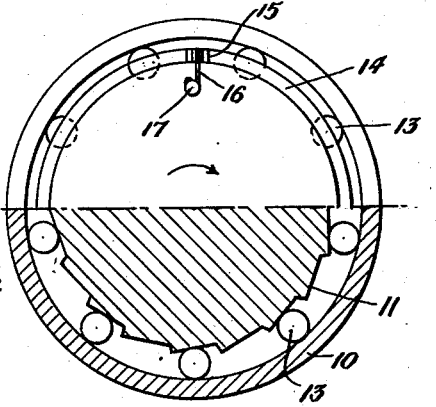

In Figures 1 to 3, the driving member 6 carries a fixed friction clutch plate 7 and a sliding friction clutch plate 8 between which is a driven clutch plate 9 mounted on a sleeve 10 forming the outer race of a roller clutch whose inner race 11 is formed on the driven member 12 and whose rollers 13 are trapped in a cage 14 having slotted lugs 15 (only one shown) engaged by springs 16 anchored on pins 17 fixed in the driven member 12. These springs urge the cage in the direction of the arrow in Figure 3, which indicates the direction of rotation, and therefore tend to press the rollers in the direction for engaging the roller clutch and ensure that it engages promptly when the sleeve 10 is moved in the driving direction.

The sliding plate 8 is engageable by fly-weights in the form of heavy rollers 18 carried by rockers 19, pivoted on the driving member 6 at 30, which are subject to the action of springs 20 tending to hold the rollers 18 clear of the plate 8, until the driving member 6 has attained a certain (relatively low) speed, above which the centrifugal force of the rollers exceeds the spring loading and exerts progressively increasing clutch-engaging pressure on the sliding clutch plate as the speed of the driver increases.

The driving member 6 incorporates an outer race 21 of a main roller clutch, whose inner race 22 is formed on the driven member 12 and whose rollers 23 are trapped in a cage 24. Pivot pins 25 fixed in the driven member 12 carry rocking levers 26 (one only shown), of which one end carries a weight 27 and the other engages a slotted lug 28 formed on the cage 24. The centrifugal force of weights 27 applied through the levers 26 tends to move the cage 24 in the direction of the arrow in Figure 2, which is the direction of rotation, and engage the roller clutch 21, 22, 23; but has first to overcome the effort of springs 29 urging the levers 26 in the opposite direction and tending to move the cage 24 in the direction for preventing the rollers 23 from wedging the races 21, 22. The strength of springs 29 is so adjusted relatively to the mass of weights 27 that the roller clutch 21, 22, 23 cannot engage until the driven member 12 reaches a (relatively high) critical speed which is above that at which the friction clutch becomes fully engaged. Once this critical speed is exceeded, the weights 27 overcome the springs 29 and shift the cage 24 in the direction of the arrow and cause the roller clutch 21, 22, 23 to engage.

In the modification of Figs. 4 and 5, each of the rockers 19 carrying fly-weight 18 has a notch 31 engageable by the nose of a trip lever 32, pivoted on a pin 33 mounted in the clutch housing forming part of the driving member 6, and urged into engagement with the notch 31 by a spring 35 which bears on the tail 34 of the trip lever and finds its abutment on the member 6. The tail 34 of the trip lever is engageable by a roller 36 mounted on a pin 37 carried by the fork-end 38 of a plunger 39, which slides in a housing 40 secured to a stationary casing 41 enclosing the clutch mechanism. Plunger 39 is prevented from turning by a grub-screw 43 which enters a keyway 42 formed in the plunger. A spring 44 depresses the plunger 39 and causes the roller 36 to engage the tail 34 of the trip lever 32, and the plunger is withdrawable to a position in which the roller 36 clears the tails 34 of the trip levers (as shown in dotted lines in Fig. 5) by a control cable 45.

When the plunger carrying the roller 36 is withdrawn the trip levers 32 are urged by springs 35 towards the position for engaging the notches 31 of the rockers 19 and, when the member 6 stops rotating and the rockers 19 fall back under the action of springs 20 (see Fig. 1) into the full line position of Fig. 4 the noses of levers 32 enter the notches and lock the fly-weights 18 out of engagement with the clutch plate 8. But when the tension of the cable 45 is released allowing the spring 44 to depress the plunger 39, the roller 36 strikes the tail 34 of each trip lever in turn as soon as the member 6 is rotated and disengages the noses of the trip levers one after another from the notches 31, allowing the fly-weights 18 to move outwards under centrifugal force and engage the clutch plate 8. Once the fly-weights 18 and rockers 19 have moved outwards to the position shown in chain-dotted lines in Fig. 5 the noses of the trip levers 32 cannot re-engage the notches 19. The position of the trip levers and fly-weight rockers when the fly-weights have moved outwards to their furthest extent, and the friction clutch is fully engaged, is indicated in dotted lines in Fig. 5.

It will be noted that once the fly-weights have been locked out of engagement with the clutch plate 8, they will remain so locked (by engagement of parts 31, 32, Fig. 5), even though the plunger 39 be depressed, until the member 6 is rotated sufficiently to bring the roller 36 into contact successively with the several trip elements 34 all the way around the clutch.

The control cable 45 may be connected to a brake for braking the driven member, so that the plunger 39 is withdrawn for locking the fly-weights out of action when the brake is applied.

By way of summarizing typical operations of the mechanism, it may be assumed that shaft 6 is coupled to a helicopter engine and shaft 12 to the lifting rotor of the helicopter. As the engine starts to pick up, it attains a certain minimum critical speed, at which fly-weights 18 engage the friction clutch 7, 8, 9, and this drives shaft 12 through one-way clutch rollers 13 (which are spring-loaded in the engaging sense). After full engagement of the friction clutch, the driven shaft 12 reaches a critical speed at which the fly-weights 27 engage the main one-way positive clutch rollers 23 which can readily be designed to carry the maximum torque of the drive to the rotor. If the rotor shaft 12 should be speeded up by some aerodynamic action of the rotor, or if the engine shaft 6 is slowed down, both of the one-way clutches operate to permit free-wheeling of the rotor. If the driving torque again predominates (before stoppage of rotation), the re-engagement will occur at the main one-way clutch rollers 23, as a positive drive, if the speed of shaft 12 is above the upper of the two critical speeds; but will occur through the slipping friction clutch and the auxiliary one-way clutch rollers 13, if shaft 12 is rotating below said critical speed, provided the drive shaft 6 has not dropped below the minimum critical speed (the speed at which fly-weights 18 can overcome the springs 20). If the whole assembly drops below the minimum critical speed, or if the driven shaft 12 is slowed down below that speed, as by application of the rotor brake, the drive will be disconnected, and not re-connected under those conditions, since the springs 20 of the fly-weights 18 will prevent engagement of the friction clutch, and the springs 29 for the fly-weights 27 will prevent engagement of the main positive clutch rollers 23.

We claim:

1. For a power transmission system having a driving member and a driven member, a compound clutch comprising in combination a friction clutch having means of engagement and a positive clutch, said clutches being operatively arranged in parallel whereby each serves to connect said driving and driven members, the positive clutch being of the one-way type and having a speed-responsive device whereby it is automatically engaged when the driven member exceeds a critical speed, and an auxiliary positive one-way clutch operatively arranged in series with the friction clutch, by which combination the driven member can overrun the driving member freely.

2. A compound clutch as claimed in claim 1, in which the friction clutch is automatically controlled and for that purpose has automatic means of engagement comprising a speed-responsive device which engages it progressively as the speed of the driving member increases above a certain minimum critical speed, whereby the friction clutch engagement is complete at a speed less than the critical speed which determines the engagement of the first-mentioned positive clutch.

3. A compound clutch as claimed in claim 2, in which the first-mentioned positive clutch is of the rolling-element type having a rotatable cage for the rolling elements and the speed responsive device controlling it has centrifugal elements carried on rockers pivoted on the driven member and operative to urge the cage in the engaging direction, the cage being spring-loaded in the disengaging direction.

4. A compound clutch as claimed in claim 2, which includes a separately controlled device for locking the speed-responsive control means of the friction clutch in an inoperative condition.

5. A compound clutch as claimed in claim 4, in which the speed responsive device controlling the friction clutch comprises centrifugal elements pivoted on a part moving with the driving member and operative on a part of the friction clutch member to urge it in the engaging direction, and the locking device comprises trip levers moving with the driving member and spring-loaded to engage the centrifugal elements and lock them in inoperative position, together with a displaceable roller movably mounted in a position to trip the levers and release the centrifugal elements.

6. A compound clutch as claimed in claim 1, in which the auxiliary positive one-way clutch connects the friction clutch with the driven member.

7. A compound clutch as claimed in claim 1, in which the auxiliary positive clutch is of the rolling-element type having a cage which is spring-loaded in the engaging direction.

CYRIL GEORGE PULLIN.
KENNETH WATSON.

REFERENCES CITED

The following references are of record in the file of this patent:

UNITED STATES PATENTS

| Number | Name | Date |
|---|---|---|
| 551,760 | Gere | Dec. 24, 1895 |
| 1,608,553 | Fieux | Nov. 30, 1926 |
| 1,902,701 | Hegemann | Mar. 21, 1933 |
| 1,935,684 | Wemp | Nov. 21, 1933 |